United States Patent
Hoshi et al.

(10) Patent No.: US 12,330,625 B2
(45) Date of Patent: Jun. 17, 2025

(54) CONTROL METHOD FOR SERIES HYBRID VEHICLE AND SERIES HYBRID VEHICLE

(71) Applicant: Nissan Motor Co., Ltd., Yokohama (JP)

(72) Inventors: Kiyoshi Hoshi, Kanagawa (JP); Hiroko Katayama, Kanagawa (JP); Azusa Kobayashi, Kanagawa (JP); Hiroyasu Fujita, Kanagawa (JP); Hiromu Morishita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 201 days.

(21) Appl. No.: 18/019,863

(22) PCT Filed: Aug. 7, 2020

(86) PCT No.: PCT/JP2020/030438
§ 371 (c)(1),
(2) Date: Feb. 6, 2023

(87) PCT Pub. No.: WO2022/030007
PCT Pub. Date: Feb. 10, 2022

(65) Prior Publication Data
US 2023/0339452 A1  Oct. 26, 2023

(51) Int. Cl.
*B60W 20/14* (2016.01)
*B60L 50/61* (2019.01)

(52) U.S. Cl.
CPC ............. *B60W 20/14* (2016.01); *B60L 50/61* (2019.02)

(58) Field of Classification Search
CPC ......... B60W 20/14; B60W 2050/0027; B60W 2050/0028; B60W 2050/0039;
(Continued)

(56) References Cited

U.S. PATENT DOCUMENTS 5,844,342 A * 12/1998 Miyatani ............... B60W 20/40
                                                      903/905
6,278,195 B1 * 8/2001 Yamaguchi ............. B60L 50/40
                                                      903/910
(Continued)

FOREIGN PATENT DOCUMENTS

JP  H09-137853 A  5/1997
JP  2016-043908 A  4/2016
(Continued)

OTHER PUBLICATIONS

Translation of WO-2019116582-A1 retrieved from IP.com on Oct. 8, 2024 (Year: 2024).*

*Primary Examiner* — Fadey S. Jabr
*Assistant Examiner* — Faris Asim Shaikh
(74) *Attorney, Agent, or Firm* — Young Basile Hanlon & MacFarlane, P.C.

(57) ABSTRACT

In a control method of a vehicle, an electric power consumption, which is an electric power consumed by the motoring, includes a friction electric power consumption, which is an electric power consumption of the motoring determined according to friction of the internal combustion engine, and an inertia electric power, which is an electric power consumed for an inertia torque for changing a rotation speed of the internal combustion engine.

10 Claims, 10 Drawing Sheets

(58) Field of Classification Search
CPC . B60W 2050/0042; B60W 2050/0096; B60W 2510/0638; B60W 2510/0652; B60W 2510/0695; B60W 2510/083; B60W 2510/084; B60W 2510/244; B60W 2520/10; B60W 2520/105; B60W 2540/10; B60W 2540/16; B60W 2710/0644; B60W 2710/0661; B60W 2710/0666; B60W 2710/0672; B60W 2710/081; B60W 2710/082; B60W 2710/085; B60W 10/06; B60W 10/08; B60W 10/26; B60W 20/11; B60W 30/182; B60W 40/12; B60W 2710/083; B60W 2720/106; B60W 30/18127; B60W 30/1882; B60W 50/082; B60L 50/61; B60L 15/20; B60L 15/2009; B60L 7/14; B60L 7/16; B60L 2240/421; B60L 2240/423; B60L 2240/441; B60L 2240/443; B60K 6/46; Y02T 10/62; Y02T 10/70

See application file for complete search history.

(56) References Cited

U.S. PATENT DOCUMENTS

| | | | | |
|---|---|---|---|---|
| 6,359,345 | B1* | 3/2002 | Suzuki | B60K 6/543 290/40 C |
| 7,040,434 | B2* | 5/2006 | Komiyama | B60W 20/00 701/22 |
| 2004/0206102 | A1* | 10/2004 | Homan | F25B 49/025 62/229 |
| 2007/0210648 | A1* | 9/2007 | Sato | B60T 13/161 303/155 |
| 2007/0243970 | A1* | 10/2007 | Amano | B60W 10/08 477/3 |
| 2014/0163794 | A1* | 6/2014 | Park | B60W 50/038 180/65.265 |
| 2015/0203104 | A1* | 7/2015 | Haneda | B60K 6/48 180/65.265 |
| 2016/0059857 | A1* | 3/2016 | Ikedaya | B60L 50/51 701/22 |
| 2016/0264128 | A1* | 9/2016 | Imamura | B60W 10/06 |
| 2017/0066434 | A1 | 3/2017 | Kato | |
| 2017/0291597 | A1 | 10/2017 | Hata et al. | |
| 2018/0162214 | A1* | 6/2018 | Yoshida | B60K 6/485 |
| 2018/0180012 | A1* | 6/2018 | Yoshida | B60W 10/08 |
| 2018/0208077 | A1* | 7/2018 | Kato | F16H 63/50 |
| 2019/0152469 | A1* | 5/2019 | Kim | B60K 6/52 |
| 2020/0247391 | A1* | 8/2020 | Miwa | F02D 41/0235 |
| 2023/0003430 | A1* | 1/2023 | Matsumoto | F25B 49/025 |

FOREIGN PATENT DOCUMENTS

| | | | |
|---|---|---|---|
| JP | 2017-047821 A | 3/2017 | |
| JP | 2017-177974 A | 10/2017 | |
| JP | 2017-185940 A | 10/2017 | |
| WO | WO-2019116582 A1 * | 6/2019 | B60K 6/46 |

* cited by examiner

CONTROL METHOD FOR SERIES HYBRID VEHICLE AND SERIES HYBRID VEHICLE

TECHNICAL FIELD

The present invention relates to a series hybrid vehicle.

BACKGROUND ART

JP 2017-47821 A discloses a technique of reducing a charge electric power of a battery by increasing an electric power consumption of a motor used for motoring when a required braking force is large. JP 2016-43908 A discloses a hybrid vehicle having a shift stage D and a shift stage B having a regenerative braking force stronger than that of the shift stage D.

SUMMARY OF INVENTION

Motoring of an internal combustion engine is performed, for example, when a regenerative electric power exceeding an acceptable electric power of a battery is generated during regeneration. The motoring makes it possible to consume an amount of electric power that exceeds the acceptable electric power of the battery.

However, an electric power consumption of the motoring increases as a rotation speed of the motoring increases toward a target rotation speed. Therefore, during this period, regeneration of a traveling motor is limited based on the electric power consumption corresponding to the rotation speed of the motoring during the increase.

As a result, even when a target deceleration speed changes due to, for example, range switching, a deceleration speed of a vehicle gradually changes as the rotation speed of the motoring changes. Therefore, some drivers may be dissatisfied with a feeling of deceleration obtained when the target deceleration speed changes.

The present invention has been made in view of such a problem, and an object of the present invention is to quickly obtain a feeling of deceleration during regeneration accompanied by motoring.

A method for controlling a series hybrid vehicle having a first forward range and a second forward range according to one embodiment of this invention, the method comprising: driving drive wheels by a traveling motor using an electric power of an electric power generation motor that is driven with a power of an internal combustion engine to generate an electric power; performing motoring of the internal combustion engine by the electric power generation motor when a regenerative electric power exceeding an acceptable electric power of a battery is generated by the traveling motor; and performing regeneration by the traveling motor with a total electric power of an electric power consumed by the motoring and the acceptable electric power of the battery as an upper limit, wherein the electric power consumed by the motoring includes an electric power consumption of the motoring determined according to friction of the internal combustion engine and an inertia electric power that is an electric power consumed for an inertia torque for changing a rotation speed of the internal combustion engine.

According to another embodiment of the invention there is provided a control device for a series hybrid vehicle corresponding to the above-mentioned control method for a series hybrid vehicle.

DESCRIPTION OF EMBODIMENTS

Hereinafter, an embodiment of the present invention will be described with reference to the accompanying drawings.

Figure 1:
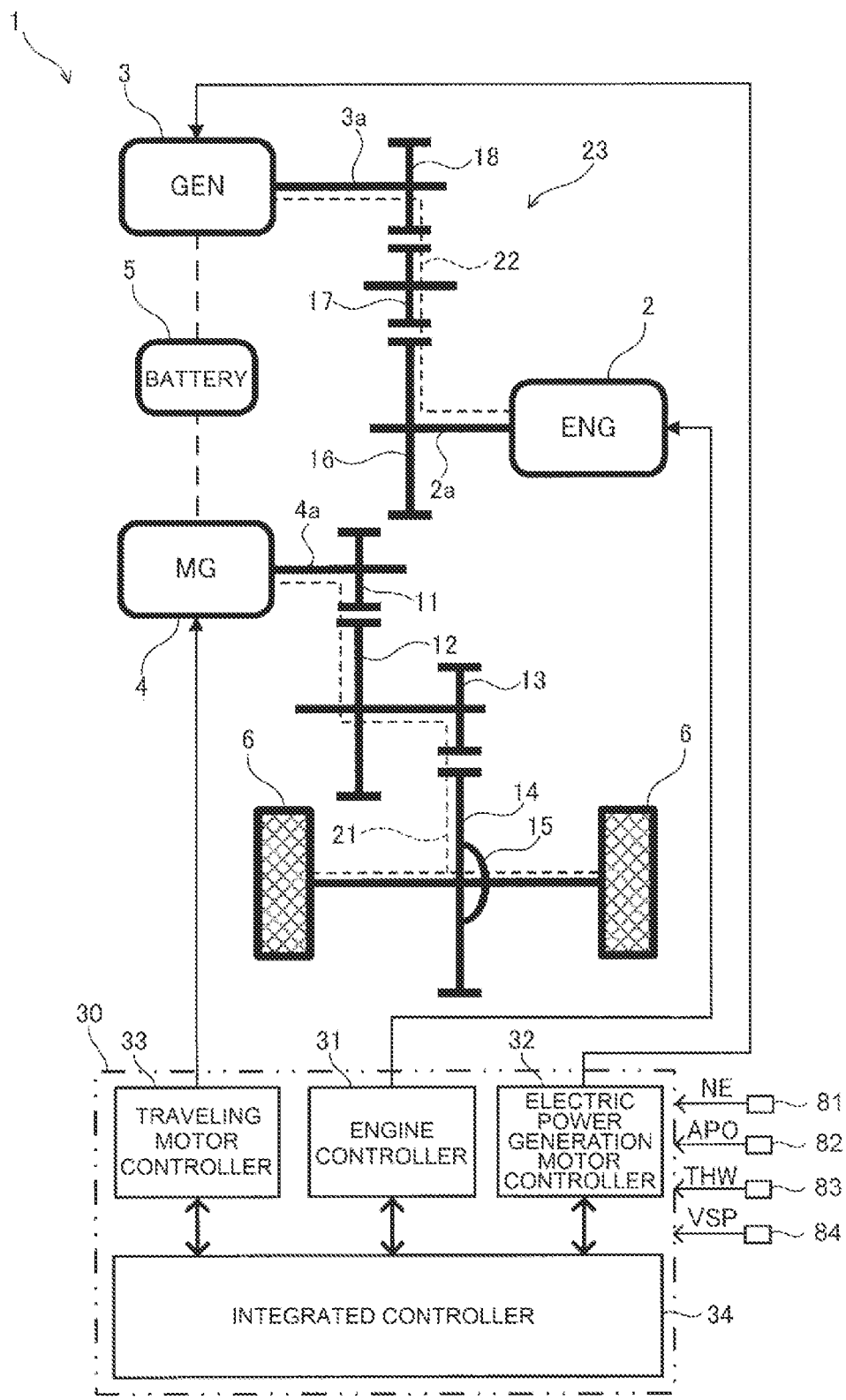
FIG. 1 is a schematic configuration diagram showing a main part of a vehicle.

FIG. 1 is a schematic configuration diagram showing a main part of a vehicle 1. The vehicle 1 includes an internal combustion engine 2, an electric power generation motor 3, a traveling motor 4, a battery 5, and drive wheels 6.

The internal combustion engine 2 may be a gasoline engine or a diesel engine. The electric power generation motor 3 is driven by a power of the internal combustion engine 2 to generate an electric power. The traveling motor 4 is driven by an electric power of the battery 5 to drive the drive wheels 6. The traveling motor 4 also has a so-called regeneration function of regenerating a deceleration energy as an electric power by being rotated together with a rotation of the drive wheels 6 during deceleration or the like. The battery 5 is charged with the electric power generated by the electric power generation motor 3 and the electric power regenerated by the traveling motor 4.

The vehicle 1 includes a first power transmission path 21 and a second power transmission path 22. The first power transmission path 21 transmits a power between the traveling motor 4 and the drive wheels 6. The second power transmission path 22 transmits a power between the internal combustion engine 2 and the electric power generation motor 3. The first power transmission path 21 and the second power transmission path 22 are power transmission paths independent of each other, that is, power transmission paths in which a power is not transmitted from one of the first power transmission path 21 and the second power transmission path 22 to the other.

The first power transmission path 21 includes a first reduction gear 11 provided on a rotation shaft 4a of the traveling motor 4, a second reduction gear 12 meshing with the first reduction gear 11, a third reduction gear 13 provided coaxially with the second reduction gear 12 and meshing with a differential gear 14, and the differential gear 14 provided in a differential case 15.

The second power transmission path 22 includes a fourth reduction gear 16 provided on an output shaft 2a of the internal combustion engine 2, a fifth reduction gear 17 meshing with the fourth reduction gear 16, and a sixth reduction gear 18 provided on a rotation shaft 3a of the electric power generation motor 3 and meshing with the fifth reduction gear 17.

Each of the first power transmission path 21 and the second power transmission path 22 does not include an element that blocks power transmission. That is, each of the first power transmission path 21 and the second power transmission path 22 is always in a state in which a power is transmitted.

The second power transmission path 22 constitutes a power transmission path of a power transmission system 23. The power transmission system 23 includes the internal combustion engine 2 and the electric power generation motor 3, and is configured such that a power is transmitted from the electric power generation motor 3 to the internal combustion engine 2 during motoring of the internal combustion engine 2.

The vehicle 1 further includes a controller 30. The controller 30 includes an engine controller 31 that controls the internal combustion engine 2, an electric power generation motor controller 32 that controls the electric power generation motor 3, a traveling motor controller 33 that controls the traveling motor 4, and an integrated controller 34 that integrates control of the vehicle 1.

The engine controller 31 is implemented by a microcomputer including a central processing unit (CPU), a read-only memory (ROM), a random access memory (RAM), and an input/output interface (I/O interface). The same applies to the electric power generation motor controller 32, the traveling motor controller 33, and the integrated controller 34. The engine controller 31, the electric power generation motor controller 32, and the traveling motor controller 33 are communicably connected to each other via the integrated controller 34 using a CAN standard bus.

The controller 30 receives signals from various sensors and switches including a rotation speed sensor 81 for detecting a rotation speed NE of the internal combustion engine 2, an accelerator position sensor 82 for detecting an accelerator position (accelerator opening degree) APO indicating a depression amount of an accelerator pedal, a water temperature sensor 83 for detecting a water temperature THW of the internal combustion engine 2, and a vehicle speed sensor 84 for detecting a vehicle speed VSP. These signals are input to the integrated controller 34 directly or via another controller such as the engine controller 31.

The vehicle 1 is a series hybrid vehicle in which the drive wheels 6 are driven by the traveling motor 4 using the electric power of the electric power generation motor 3 that is driven by the power of the internal combustion engine 2 to generate the electric power.

Figure 2:
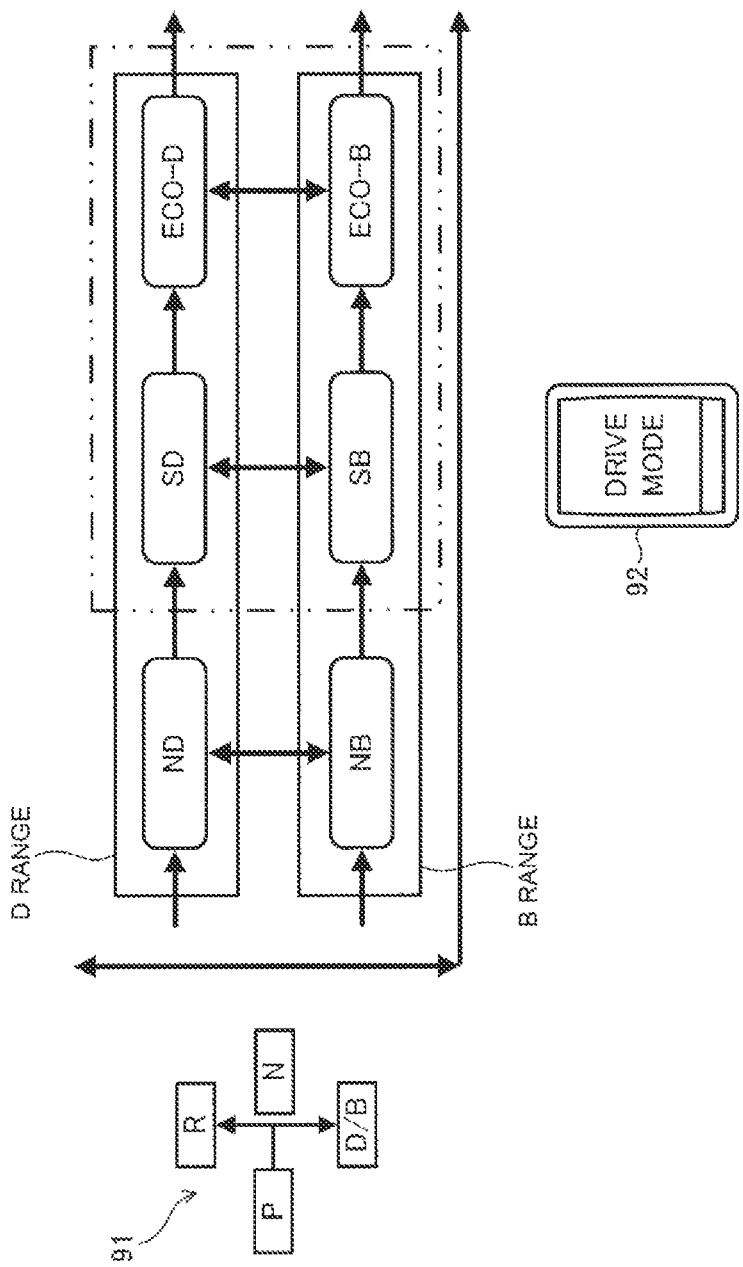
FIG. 2 is an explanatory diagram of ranges and a drive mode.

FIG. 2 is an explanatory diagram of ranges and a drive mode. The vehicle 1 includes a shifter 91. The shifter 91 is a device for performing range switching according to a driver operation, and the driver operation is performed based on a shift lever operation or a switch operation to a gate corresponding to each range.

The shifter 91 is a momentary shifter. In the momentary shifter 91, a shift lever released from the driver operation autonomously returns to a home position which is a neutral position. A range selected according to the driver operation is displayed on a range display provided in a vehicle interior together with a drive mode to be described later. The range display makes a selected range visible.

The ranges selectable with the shifter 91 include a P range (parking range), an R range (reverse range), and an N range (neutral range) as well as a D range which is a first forward range and a B range which is a second forward range.

The D range and the B range are selected according to a shift lever operation to a D/B gate common to the D range and the B range. According to the shift lever operation to the D/B gate, the B range is to be selected when the D range is selected, and the D range is to be selected when the B range is selected. When a range other than the D range and the B range is selected, the D range is to be selected according to the shift lever operation to the D/B gate. The D range and the B range will be further described later.

The vehicle 1 includes a drive mode switch 92. The drive mode switch 92 is a switch for changing the drive mode according to a driver operation.

The drive mode includes an N mode, an S mode, and an ECO mode. The N mode is a mode (normal mode) in which acceleration is performed according to an accelerator pedal operation. Therefore, in the N mode, regenerative deceleration is not performed according to the accelerator pedal operation. Each of the S mode and the ECO mode is a mode (one-pedal mode) in which acceleration and regenerative deceleration are performed according to the accelerator pedal operation, and the ECO mode is a mode more suitable for fuel-efficient driving than the S mode. The drive mode is changed in an order of the N mode, the S mode, and the ECO mode each time the drive mode switch 92 is pressed. After the ECO mode, the drive mode returns to the N mode.

In the vehicle 1, depending on combinations with selected drive modes, the D range forms an ND mode in combination with the N mode, an SD mode in combination with the S mode, and an ECO-D mode in combination with the ECO mode. Similarly, the B range forms an NB mode, an SB mode, and an ECO-B mode depending on combinations with selected drive modes, respectively.

The B range is a range in which a deceleration speed of the vehicle 1 caused by the regeneration of the traveling motor 4 when the accelerator pedal is in an OFF state is larger than that in the D range. In other words, a target deceleration speed is set to be larger in the B range than in the D range. A large deceleration speed means that a degree of deceleration speed is large (an absolute value of a deceleration speed is large). The same applies to the target deceleration speed. In the B range, a regenerative electric power generated by the traveling motor 4 is larger in an absolute value than in the D range, and as a result, the deceleration speed is larger.

In the B range, a target rotation speed NE_T of the internal combustion engine 2 driven by the electric power generation motor 3, that is, the target rotation speed NE_T of the motoring of the internal combustion engine 2 is set to be higher than that in the D range. Therefore, in the B range, an electric power consumption CP of the motoring is also larger than that in the D range.

The motoring of the internal combustion engine 2 is performed, for example, when a regenerative electric power exceeding an acceptable electric power P_IN of the battery 5 is generated during regeneration. The motoring makes it possible to consume an amount of electric power that exceeds the acceptable electric power P_IN.

However, the electric power consumption CP of the motoring increases as the rotation speed NE of the motoring increases toward the target rotation speed NE_T. Therefore, during this period, the regeneration of the traveling motor 4 is limited based on the electric power consumption CP corresponding to the rotation speed NE of the motoring during the increase.

As a result, even when the target deceleration speed changes due to, for example, the range switching, the deceleration speed of the vehicle 1 gradually changes as the rotation speed NE of the motoring changes. Therefore, there is a concern that some drivers may be dissatisfied with a feeling of deceleration obtained when the target deceleration speed changes due to range switching to a range with a large deceleration speed.

In view of such circumstances, in the present embodiment, the integrated controller 34 is implemented as described below.

Figure 3:
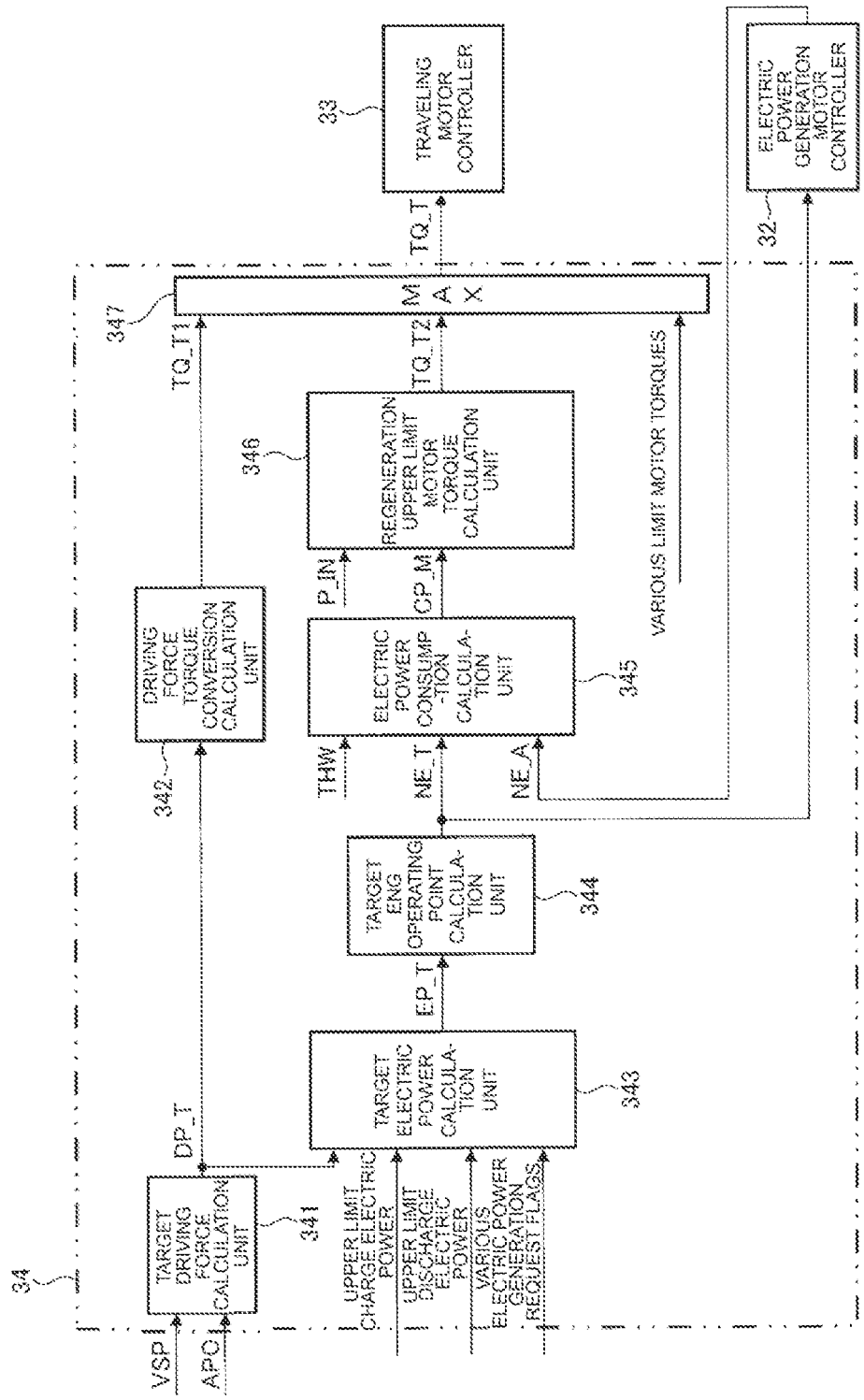
FIG. 3 is a block diagram showing processing executed by an integrated controller.

FIG. 3 is a block diagram showing processing executed by the integrated controller 34. FIG. 3 shows calculation processing of a target motor torque TQ_T of the traveling motor 4. The integrated controller 34 includes a target driving force calculation unit 341, a driving force torque conversion calculation unit 342, a target electric power calculation unit 343, a target ENG operating point calculation unit 344, an electric power consumption calculation unit 345, a regeneration upper limit motor torque calculation unit 346, and a target motor torque determination unit 347.

The target driving force calculation unit 341 calculates a target driving force DP_T of the traveling motor 4 based on the vehicle speed VSP and the accelerator position APO. The target driving force DP_T can be set in advance based on map data according to the vehicle speed VSP and the accelerator position APO. In the target driving force calculation unit 341, a negative target driving force DP_T, that is, a target regenerative power is calculated during the regeneration. The calculated target driving force DP_T is input to the driving force torque conversion calculation unit 342 and the target electric power calculation unit 343.

The driving force torque conversion calculation unit 342 converts the target driving force DP_T into a first target motor torque TQ_T1 of the traveling motor 4. The first target motor torque TQ_T1 is a target motor torque TQ_T corresponding to the target driving force DP_T. The first target motor torque TQ_T1 is input to the target motor torque determination unit 347.

The target electric power calculation unit 343 calculates, based on the target driving force DP_T, a target electric power EP_T for electric power generation or discharge by the electric power generation motor 3. In the electric power generation, the electric power generation motor 3 is driven by the internal combustion engine 2, and in the discharge, the internal combustion engine 2 is driven by the electric power generation motor 3, that is, motoring is performed.

When a positive target driving force DP_T is input, the target electric power calculation unit 343 calculates a target electric power EP_T for electric power generation. The target electric power EP_T for electric power generation is corrected by, for example, adding an electric power according to various electric power generation request flags. The target electric power EP_T for electric power generation is calculated with an upper limit charge electric power as an upper limit.

When the negative target driving force DP_T is input, the target electric power calculation unit 343 calculates a target electric power EP_T for discharge. The target electric power EP_T for discharge is calculated as an absolute value with an upper limit discharge electric power as an upper limit. The calculated target electric power EP_T is input to the target ENG operating point calculation unit 344.

The target ENG operating point calculation unit 344 calculates a target operating point of the internal combustion engine 2 based on the target electric power EP_T. The target operating point can be set in advance based on map data according to the target electric power EP_T. When the discharge, that is, the motoring is performed, the target ENG operating point calculation unit 344 calculates the target rotation speed NE_T as the target operating point. The calculated target rotation speed NE_T is input to the electric power generation motor controller 32 and the electric power consumption calculation unit 345.

The electric power generation motor controller 32 controls the electric power generation motor 3 based on the input target rotation speed NE_T. Accordingly, the motoring of the internal combustion engine 2 is performed, and an electric power is consumed. An actual rotation speed NE_A is input from the electric power generation motor controller 32 to the electric power consumption calculation unit 345. The actual rotation speed NE_A is an actual value (sensor value) of the rotation speed NE of the internal combustion engine 2, and is detected based on a signal from the rotation speed sensor 81. The water temperature THW of the internal combustion engine 2 based on a signal from the water temperature sensor 83 is also input to the electric power consumption calculation unit 345.

The electric power consumption calculation unit 345 calculates an electric power consumption CP_M of the motoring. The electric power consumption CP_M is an electric power consumed by the motoring, and is an estimated value. The electric power consumption CP_M is obtained, for example, by adding an inertia electric power CP_I to a friction electric power consumption CP_A.

The friction electric power consumption CP_A is a steady electric power consumption CP of the motoring corresponding to friction of the internal combustion engine 2. The friction electric power consumption CP_A constitutes the electric power consumption CP of the motoring determined according to the friction of the internal combustion engine 2, and the friction of the internal combustion engine 2 changes according to the rotation speed NE of the internal combustion engine 2.

The inertia electric power CP_I is an electric power consumed for an inertia torque for changing the rotation speed NE of the internal combustion engine 2, and indicates a transient electric power consumption CP of the motoring. The inertia electric power CP_I is an electric power for generating or canceling a change in the inertia torque of the power transmission system 23. The electric power consumption calculation unit 345 will be further described later.

The calculated electric power consumption CP_M is input to the regeneration upper limit motor torque calculation unit 346. Information on the acceptable electric power P_IN of the battery 5 is also input to the regeneration upper limit motor torque calculation unit 346.

The regeneration upper limit motor torque calculation unit 346 calculates a second target motor torque TQ_T2 that is a regeneration upper limit motor torque of the traveling motor 4. The second target motor torque TQ_T2 is a torque for limiting a magnitude of a regenerative electric power that exceeds the acceptable electric power P_IN to a magnitude that can be consumed by the motoring, and is calculated as follows.

Figure 4:
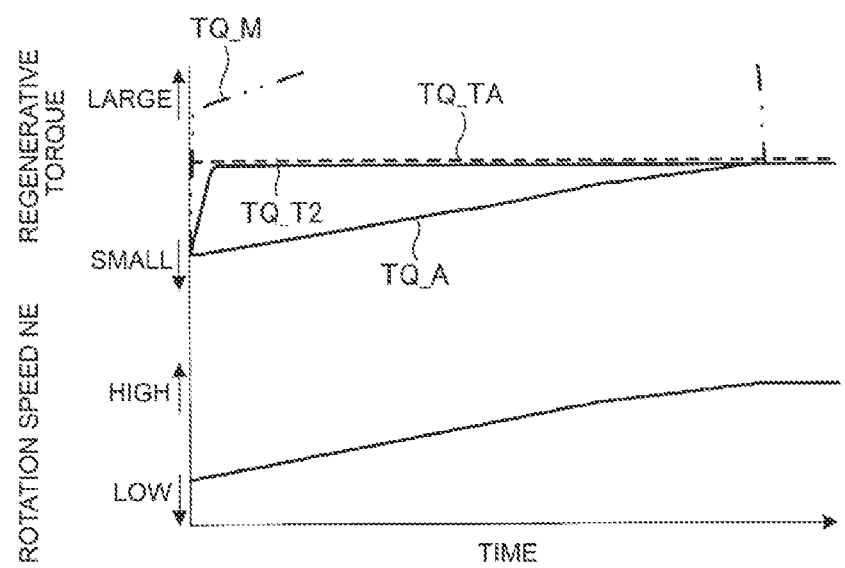
FIG. 4 is an explanatory diagram of a second target motor torque.

FIG. 4 is an explanatory diagram of the second target motor torque TQ_T2. In FIG. 4, a change in a regenerative torque is shown together with a change in the rotation speed NE. In FIG. 4, the regenerative torque is shown as an absolute value.

A regenerative torque TQ_A indicates a regenerative torque corresponding to the friction electric power consumption CP_A. Therefore, the regenerative torque TQ_A gradually changes according to the change in the rotation speed NE. A regenerative torque TQ_M indicates a regenerative torque corresponding to the electric power consumption CP_M. An inertia is taken into consideration in the regenerative torque TQ_M. As a result, the regenerative torque TQ_M rises quickly when the motoring is started.

The regenerative torque TQ_M increases beyond a destination regenerative torque TQ_TA. The destination regenerative torque TQ_TA is a regenerative torque corresponding to a destination rotation speed NE_TA. The destination rotation speed NE_TA is the target rotation speed NE_T corresponding to the target electric power EP_T of the electric power generation motor 3 used for the motoring. When the target electric power EP_T for discharge is calculated according to the target regenerative power during the regeneration, the destination rotation speed NE_TA is the rotation speed NE according to the target regenerative power.

The motoring is performed such that the rotation speed NE is the destination rotation speed NE_TA. Therefore, the magnitude of the regenerative electric power that can be consumed by the motoring is limited to a magnitude corresponding to the destination rotation speed NE_TA. Therefore, the regenerative torque TQ_M also needs to be limited to the destination regenerative torque TQ_TA corresponding to the destination rotation speed NE_TA.

Therefore, the second target motor torque TQ_T2 is calculated by limiting the regenerative torque TQ_M based on the target rotation speed NE_T. The target rotation speed NE_T further includes a command rotation speed NE_TB. The command rotation speed NE_TB is set in advance as a transient target rotation speed NE_T until the rotation speed NE reaches the destination rotation speed NE_TA.

As a result, the second target motor torque TQ_T2 is calculated so as to be the destination regenerative torque TQ_TA after changing according to the command rotation speed NE_TB from the start of the motoring.

Returning to FIG. 3, the second target motor torque TQ_T2 calculated by the regeneration upper limit motor torque calculation unit 346 is input to the target motor torque determination unit 347.

The target motor torque determination unit 347 determines the target motor torque TQ_T. The target motor torque determination unit 347 determines, as the target motor torque TQ_T, a largest motor torque among the first target motor torque TQ_T1, the second target motor torque TQ_T2, and various limit motor torques.

A motor torque TQ of the traveling motor 4 is a negative value during the regeneration. Therefore, the largest motor torque means a smallest motor torque in an absolute value during the regeneration. Accordingly, a motor torque with a strictest limitation is determined as the target motor torque TQ_T, and as a result, the other motor torque limitations are also satisfied.

When a limitation of the second target motor torque TQ_T2 is the strictest during the regeneration, the second target motor torque TQ_T2 is determined as the target motor torque TQ_T. The determined target motor torque TQ_T is input to the traveling motor controller 33. During the regeneration, the traveling motor controller 33 performs a regenerative control of the traveling motor 4 based on the target motor torque TQ_T.

As a result, when the second target motor torque TQ_T2 is determined as the target motor torque TQ_T, even if a regenerative electric power exceeding the acceptable electric power P_IN is generated, an amount of electric power that exceeds the acceptable electric power P_IN is consumed by the motoring. That is, the regeneration such as regenerative deceleration is performed by the traveling motor 4 with a total electric power of the electric power consumption CP_M and the acceptable electric power P_IN as an upper limit.

Next, the electric power consumption calculation unit 345 will be further described.

Figure 5:
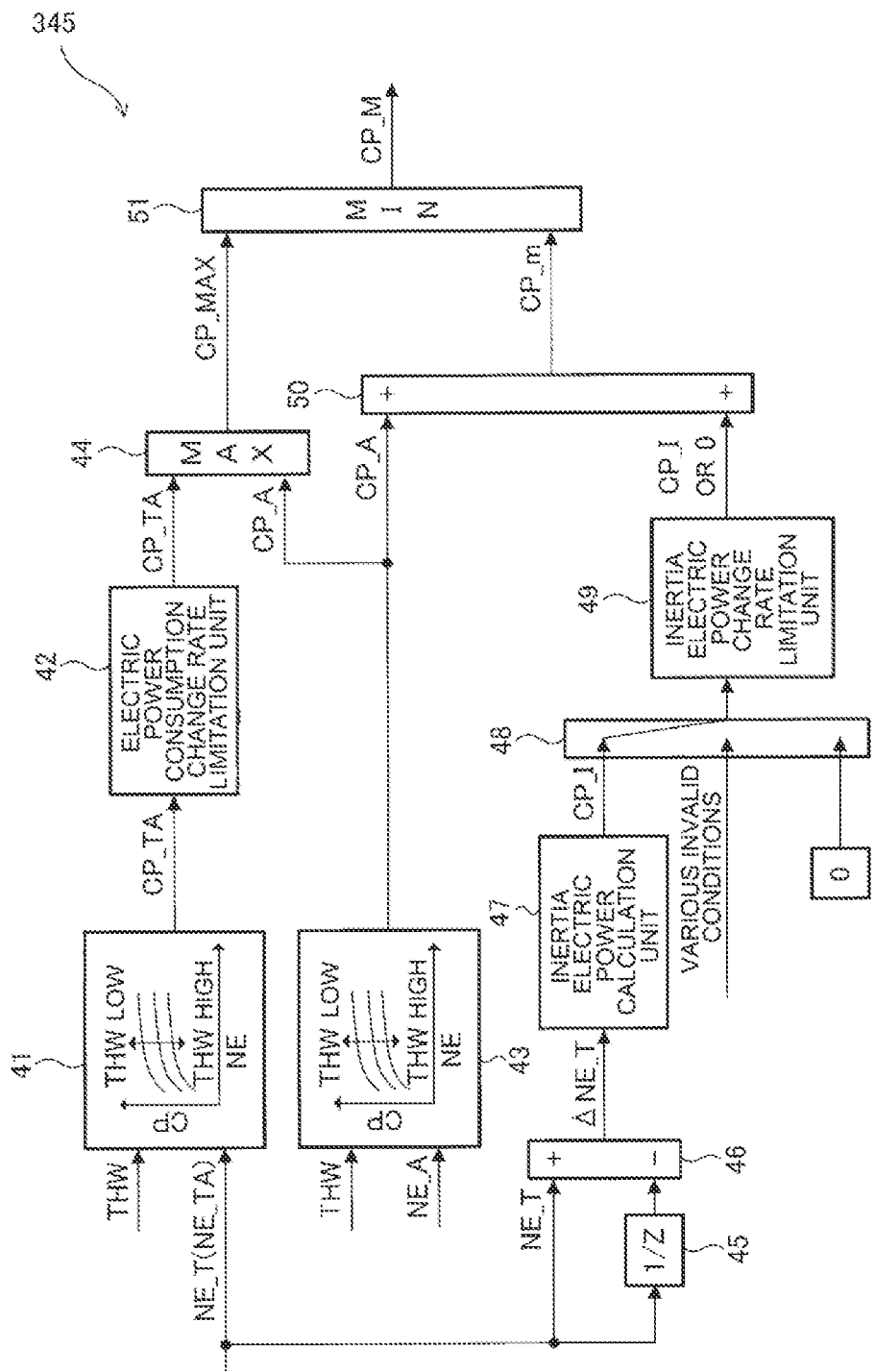
FIG. 5 is a block diagram showing processing executed by an electric power consumption calculation unit.

FIG. 5 is a block diagram showing processing executed by the electric power consumption calculation unit 345. The electric power consumption calculation unit 345 includes a destination electric power consumption calculation unit 41, an electric power consumption change rate limitation unit 42, a friction electric power consumption calculation unit 43, an upper limit selection unit 44, a previous value calculation unit 45, a difference calculation unit 46, an inertia electric power calculation unit 47, a valid/invalid selection unit 48, an inertia electric power change rate limitation unit 49, an inertia electric power reflection unit 50, and an electric power consumption limitation unit 51.

The destination electric power consumption calculation unit 41 calculates a destination electric power consumption CP_TA of the motoring. The destination electric power consumption CP_TA is the electric power consumption CP corresponding to the destination rotation speed NE_TA. The destination electric power consumption CP_TA is calculated based on the target rotation speed NE_T (destination rotation speed NE_TA) and the water temperature THW from map data of the electric power consumption CP set in advance according to the rotation speed NE and the water temperature THW. The electric power consumption CP is a positive value. The calculated destination electric power consumption CP_TA is input to the electric power consumption change rate limitation unit 42.

The electric power consumption change rate limitation unit 42 limits a change rate of the destination electric power consumption CP_TA. The electric power consumption change rate limitation unit 42 calculates the destination electric power consumption CP_TA of which a degree of change is limited, so that the destination electric power consumption CP_TA is rate-limited.

The rate limit of the destination electric power consumption CP_TA is performed in a predetermined case. The predetermined case refers to a case where the destination rotation speed The electric power consumption change rate limitation unit 42 will be further described later. The rate-limited destination electric power consumption CP_TA is input to the upper limit selection unit 44.

The friction electric power consumption calculation unit 43 calculates the friction electric power consumption CP_A. The friction electric power consumption CP_A is calculated based on the actual rotation speed NE_A and the water temperature THW from the map data of the electric power consumption CP. The calculated friction electric power consumption CP_A is input to the upper limit selection unit 44 and the inertia electric power reflection unit 50.

The upper limit selection unit 44 selects a larger electric power consumption CP of the destination electric power consumption CP_TA and the friction electric power consumption CP_A as an upper limit CP_MAX. The upper limit CP_MAX is an upper limit of the electric power consumption CP_M, and is input to the electric power consumption limitation unit 51.

The previous value calculation unit 45 is a reciprocal calculator, and stores a previous value of the target rotation speed NE_T. The previous value is a value before one JOB cycle (calculation cycle) of the integrated controller 34.

The difference calculation unit 46 calculates a difference ΔNE_T by subtracting the previous value of the target rotation speed NE_T from the input target rotation speed NE_T, that is, the target rotation speed NE_T of a current JOB cycle. The calculated difference ΔNE_T is input to the inertia electric power calculation unit 47.

The inertia electric power calculation unit 47 calculates the inertia electric power CP_I. The inertia electric power calculation unit 47 calculates an inertia torque, and further converts the calculated inertia torque into the inertia electric power CP_I. The inertia torque is calculated based on the following equation 1.

Inertia torque=angular acceleration speed×moment of inertia   [Equation 1]

The angular acceleration speed can be calculated by dividing the difference ΔNE_T by the JOB cycle. A moment of inertia of the power transmission system 23 is used as the moment of inertia.

The valid/invalid selection unit 48 selects valid/invalid of the inertia electric power CP_I based on various invalid conditions. The various invalid conditions include that the range is not the B range, that a magnitude of the difference ΔNE_T is larger than a predetermined value ΔNE_T1, and that the difference ΔNE_T is smaller than zero.

In the valid/invalid selection unit 48, the inertia electric power CP_I is selected when none of the various invalid conditions are satisfied, thereby the inertia electric power CP_I is made valid. When any one of the various invalid conditions is satisfied, zero is selected, thereby the inertia electric power CP_I is made invalid. The various invalid conditions will be further described later.

The selected inertia electric power CP_I is input to the inertia electric power change rate limitation unit 49. The same applies to a case where zero is selected. The inertia electric power change rate limitation unit 49 can receive the inertia electric power CP_I after being subjected to filtering by a low-pass filter, for example.

The inertia electric power change rate limitation unit 49 limits a change rate of the inertia electric power CP_I. In the inertia electric power change rate limitation unit 49, the inertia electric power CP_I is rate-limited by calculating the inertia electric power CP_I of which a degree of change is limited.

The rate limit of the inertia electric power CP_I is performed in a predetermined case. The predetermined case refers to a case where the destination rotation speed NE_TA decreases before the actual rotation speed NE_A reaches the destination rotation speed NE_TA, similarly to the case of the electric power consumption change rate limitation unit 42. The inertia electric power change rate limitation unit 49 will be further described later. The rate-limited inertia electric power CP_I is input to the inertia electric power reflection unit 50. The same applies to a case where zero is selected by the valid/invalid selection unit 48.

When the inertia electric power CP_I is valid, the inertia electric power reflection unit 50 calculates a provisional electric power consumption CP_m by adding the inertia electric power CP_I to the friction electric power consumption CP_A. When the inertia electric power CP_I is invalid, the inertia electric power CP_I is not reflected in the provisional electric power consumption CP_m. Processing executed by the inertia electric power reflection unit 50 is executed as follows.

Figure 6:
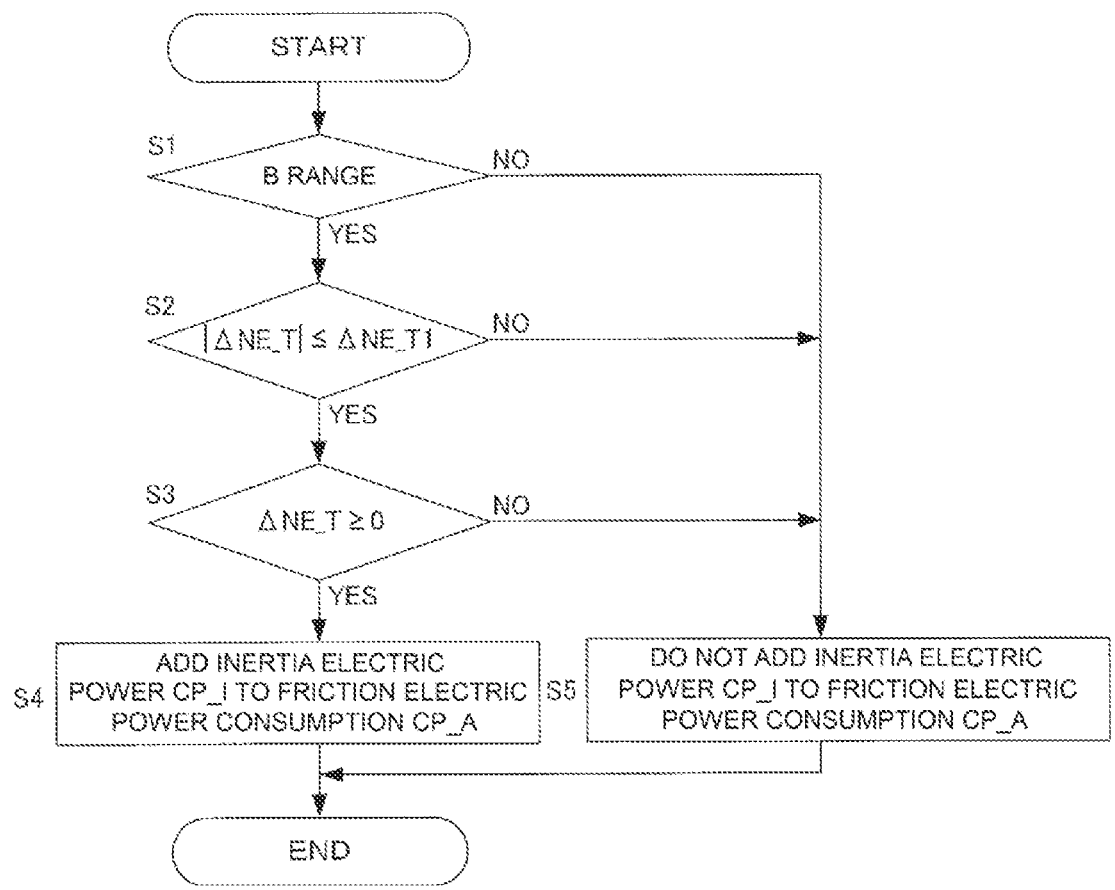
FIG. 6 is a flowchart showing processing executed by an inertia electric power reflection unit.

FIG. 6 is a flowchart showing processing executed by the inertia electric power reflection unit 50. In FIG. 6, the processing executed by the inertia electric power reflection unit 50 is shown together with processing executed by the valid/invalid selection unit 48.

The integrated controller 34 determines by measuring whether the range is the B range in step S1, determines whether the magnitude of the difference ΔNE_T is equal to or smaller than the predetermined value ΔNE_T1 in step S2, and determines whether the difference ΔNE_T is equal to or larger than zero in step S3.

When an affirmative determination is made in all of steps S1 to S3, the processing proceeds to step S4, and the integrated controller 34 adds the inertia electric power CP_I to the friction electric power consumption CP_A. That is, in this case, the inertia electric power CP_I is made valid.

When a negative determination is made in any one of steps S1 to S3, the processing proceeds to step S4, and the integrated controller 34 does not add the inertia electric power CP_I to the friction electric power consumption CP_A. That is, in this case, the inertia electric power CP_I is made invalid or is excluded.

A case where the negative determination is made in any one of steps S1 to S3 corresponds to a case where any one of various invalid conditions is satisfied. Steps S1 to S3 will be further described as follows.

When the negative determination is made in step S1, that is, when the range is not the B range, the inertia electric power CP_I is made invalid, so that it is possible to prevent a regenerative torque corresponding to the inertia electric power CP_I from being generated in a range other than the B range, and prevent the deceleration speed from increasing.

In step S2, it is determined whether the command rotation speed NE_TB rapidly fluctuates. The difference ΔNE_T indicates a change in the target rotation speed NE_T per one JOB cycle, and the target rotation speed NE_T includes the command rotation speed NE_TB. Therefore, the difference ΔNE_T indicates a command rotation acceleration speed, that is, a gradient (degree of change) of the command rotation speed NE_TB. The predetermined value ΔNE_T1 is a value for defining a case where the command rotation speed NE_TB rapidly fluctuates, and is set in advance.

When the negative determination is made in step S2, it is determined that the command rotation speed NE_TB rapidly changes. Therefore, a case where the negative determination is made in step S2, that is, a case where the magnitude of the difference ΔNE_T is larger than the predetermined value ΔNE_T1 corresponds to a case where a magnitude of the command rotation acceleration speed is larger than a predetermined value.

When the negative determination is made in step S2, the inertia electric power CP_I is made invalid, so that it is possible to prevent the regenerative torque from rapidly changing according to the inertia electric power CP_I when the command rotation speed NE_TB rapidly fluctuates.

In step S3, it is determined whether the target rotation speed NE_T is decreasing. The difference ΔNE_T indicates the gradient of the target rotation speed NE_T. Therefore, a case where the negative determination is made in step S3, that is, a case where the difference ΔNE_T is smaller than zero corresponds to a case where the target rotation speed NE_T is decreasing.

When the negative determination is made in step S3, the inertia electric power CP_I is made invalid, so that it is possible to prevent the regenerative torque from decreasing due to a negative component of the inertia electric power CP_I, and prevent the deceleration speed from decreasing.

Returning to FIG. 5, the provisional electric power consumption CP_m is input from the inertia electric power reflection unit 50 to the electric power consumption limitation unit 51. The electric power consumption limitation unit 51 selects a smaller electric power consumption CP of the upper limit CP_MAX and the provisional electric power consumption CP_m as the electric power consumption CP_M.

When the provisional electric power consumption CP_m is smaller than the upper limit CP_MAX, the provisional electric power consumption CP_m is selected, so that the provisional electric power consumption CP_m is set as the electric power consumption CP_M. When the provisional electric power consumption CP_m is equal to or larger than the upper limit CP_MAX, the upper limit CP_MAX is selected, so that the upper limit CP_MAX is set as the electric power consumption CP_M.

Next, the electric power consumption change rate limitation unit 42 and the inertia electric power change rate limitation unit 49 will be further described.

Figure 7:
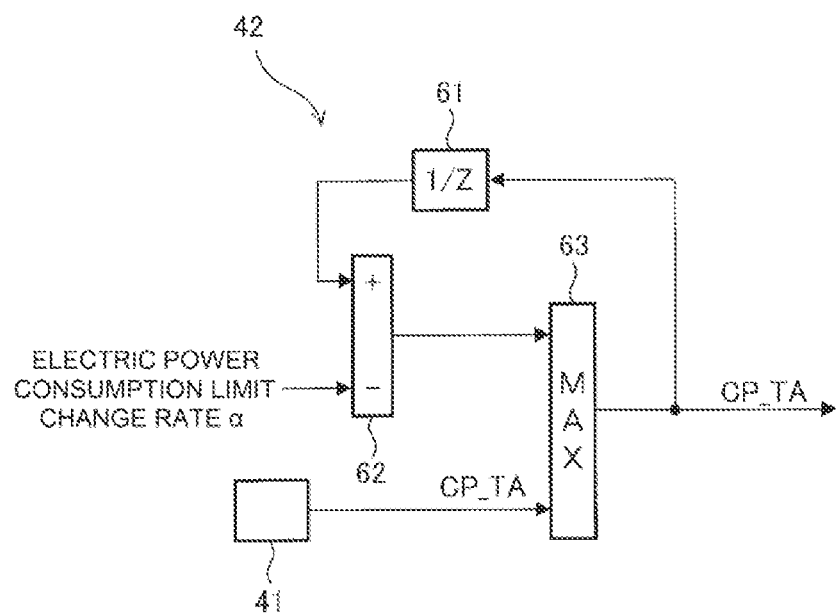
FIG. 7 is a block diagram showing processing executed by an electric power consumption change rate limitation unit.

FIG. 7 is a block diagram showing processing executed by the electric power consumption change rate limitation unit 42. The electric power consumption change rate limitation unit 42 includes a previous value calculation unit 61, a rate limit value calculation unit 62, and a destination electric power consumption selection unit 63.

The previous value calculation unit 61 is a reciprocal calculator, and stores a previous value of the destination electric power consumption CP_TA. As described above, the rate limit of the destination electric power consumption CP_TA is performed when the destination electric power consumption CP_TA decreases before the actual rotation speed NE_A reaches the destination electric power consumption CP_TA. Therefore, the previous value of the destination electric power consumption CP_TA is the destination electric power consumption CP_TA immediately before the decrease.

The previous value of the destination electric power consumption CP_TA is input to the rate limit value calculation unit 62. The rate limit value calculation unit 62 also receives an electric power consumption limit change rate a. The electric power consumption limit change rate a is a degree of change in the destination electric power consumption CP_TA due to the rate limit, and is determined in advance. The electric power consumption limit change rate a is the degree of change in each JOB cycle.

The rate limit value calculation unit 62 calculates a rate limit value of the destination electric power consumption CP_TA, that is, the rate-limited destination electric power consumption CP_TA by subtracting the electric power consumption limit change rate a from the previous value of the destination electric power consumption CP_TA.

The destination electric power consumption selection unit 63 selects, as the destination electric power consumption CP_TA, a larger one of the rate limit value of the destination electric power consumption CP_TA and the destination electric power consumption CP_TA that is input from the destination electric power consumption calculation unit 41.

The decreased destination electric power consumption CP_TA is input from the destination electric power consumption calculation unit 41. Therefore, the destination electric power consumption selection unit 63 selects the rate limit value of the destination electric power consumption CP_TA as the destination electric power consumption CP_TA.

The selected destination electric power consumption CP_TA is output from the electric power consumption change rate limitation unit 42 and stored in the previous value calculation unit 61 as the previous value of the destination electric power consumption CP_TA. The stored previous value of the destination electric power consumption CP_TA is input to the rate limit value calculation unit 62 at the time of the next calculation. As a result, the rate limit value calculation unit 62 subtracts the electric power consumption limit change rate a from the previous value of the destination electric power consumption CP_TA again.

That is, in the rate limit value calculation unit 62, the electric power consumption limit change rate a is subtracted for each JOB cycle, so that the rate limit value of the destination electric power consumption CP_TA gradually decreases. The destination electric power consumption selection unit 63 selects the rate limit value of the destination electric power consumption CP_TA as the destination electric power consumption CP_TA while the rate limit value of the destination electric power consumption CP_TA is not less than the destination electric power consumption CP_TA input from the destination electric power consumption calculation unit 41. Accordingly, the change rate of the destination electric power consumption CP_TA is limited.

When the rate limit value of the destination electric power consumption CP_TA is less than the destination electric power consumption CP_TA input from the destination electric power consumption calculation unit 41, the destination electric power consumption selection unit 63 selects, as the destination electric power consumption CP_TA, the destination electric power consumption CP_TA input from the destination electric power consumption calculation unit 41.

Figure 8:
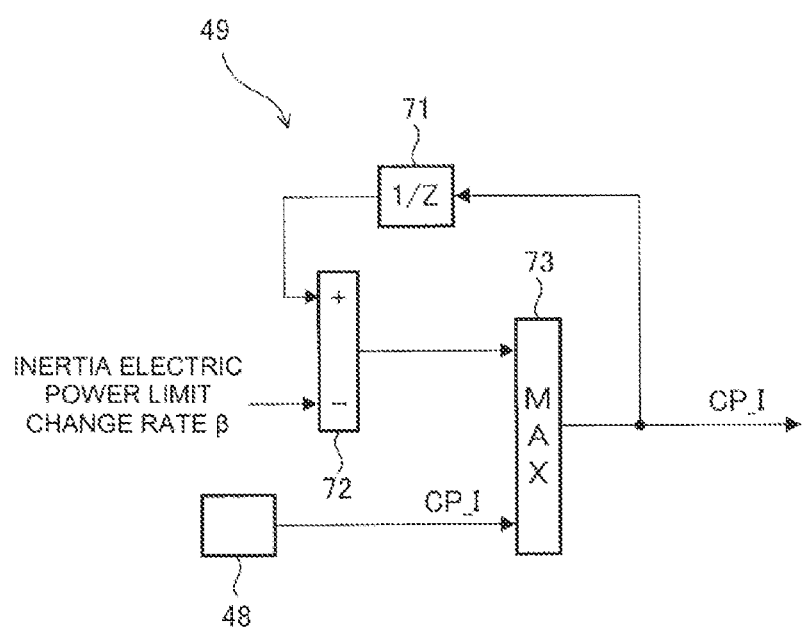
FIG. 8 is a block diagram showing processing executed by an inertia electric power change rate limitation unit.

FIG. 8 is a block diagram showing processing executed by the inertia electric power change rate limitation unit 49. The inertia electric power change rate limitation unit 49 includes a previous value calculation unit 71, a rate limit value calculation unit 72, and an inertia electric power selection unit 73.

The inertia electric power change rate limitation unit 49 is configured similarly to the electric power consumption change rate limitation unit 42 shown in FIG. 7, targeting the inertia electric power CP_I instead of the destination electric power consumption CP_TA.

Therefore, a previous value of the inertia electric power CP_I is stored in the previous value calculation unit 71, and the rate limit value calculation unit 72 subtracts an inertia electric power limit change rate R for each JOB cycle, so that a rate limit value of the inertia electric power CP_I gradually decreases. The inertia electric power limit change rate R is a degree of change in the inertia electric power CP_I due to the rate limit, and is determined in advance.

The inertia electric power selection unit 73 selects the rate limit value of the inertia electric power CP_I as the inertia electric power CP_I while the rate limit value of the inertia electric power CP_I is not less than the inertia electric power CP_I input from the valid/invalid selection unit 48. When the rate limit value of the inertia electric power CP_I is less than the inertia electric power CP_I input from the valid/invalid selection unit 48, the inertia electric power CP_I input from the valid/invalid selection unit 48 is selected as the inertia electric power CP_I. The selected inertia electric power CP_I is output from the inertia electric power change rate limitation unit 49 and stored in the previous value calculation unit 71.

Next, a timing chart corresponding to control performed by the integrated controller 34 will be described with reference to FIGS. 9 to 13.

Figure 9:
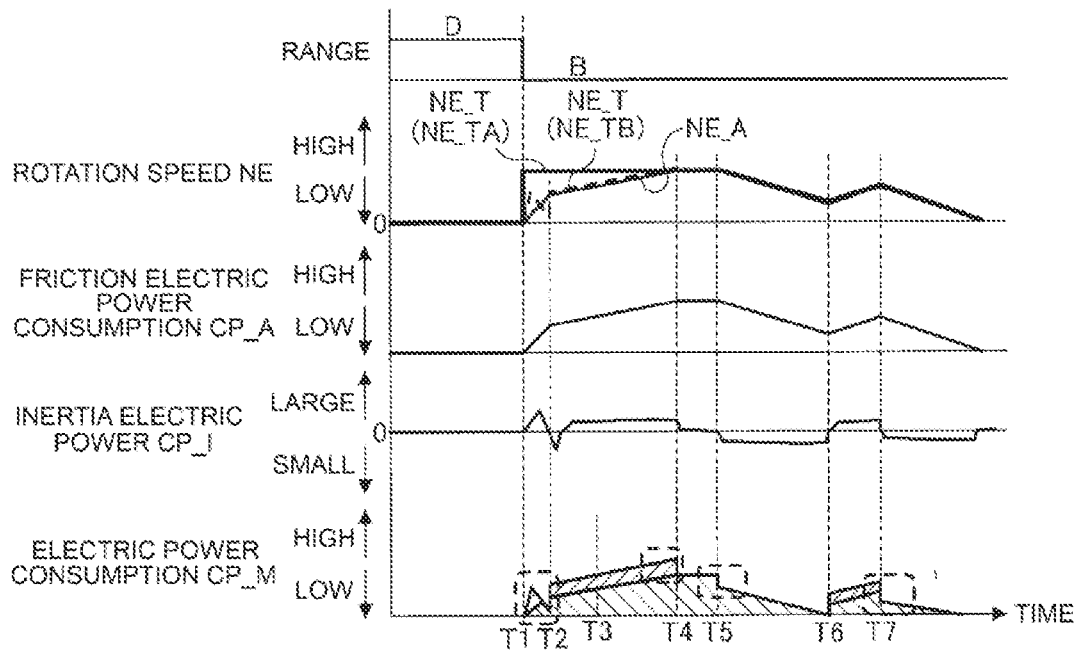
FIG. 9 is a diagram showing a first example of a timing chart.

FIG. 9 shows a first example of the timing chart. In the first example, a condition that the range is not the B range is set as the invalid condition of the inertia electric power CP_I.

At a timing T1, the range is switched from the D range to the B range during the regenerative deceleration. In the B range, a deceleration speed generated by the regeneration of the traveling motor 4 is larger than that in the D range. As a result, in the first example, a regenerative electric power exceeding the acceptable electric power P_IN is generated in response to the range switching to the B range.

Therefore, at the timing T1, the motoring is started, the destination rotation speed NE_TA rises, and the command rotation speed NE_TB starts to increase. As a result, the actual rotation speed NE_A and the friction electric power consumption CP_A also start to increase. The target rotation speed NE_T is constituted by the command rotation speed NE_TB until the command rotation speed NE_TB reaches the destination rotation speed NE_TA.

At the timing T1, the invalid condition of the inertia electric power CP_I is released in response to the range switching to the B range. Therefore, the electric power consumption CP_M is set to a value obtained by adding the inertia electric power CP_I (hatched portion on an upper side in the drawing) to the friction electric power consumption CP_A (hatched portion on a lower side in the drawing). As a result, a feeling of deceleration of the vehicle 1 is enhanced in the B range.

As shown in FIG. 9, the command rotation speed NE_TB may rapidly fluctuate immediately after the start of the motoring. In this case, the inertia electric power CP_I fluctuates according to the command rotation speed NE_TB that rapidly fluctuates.

As a result, the electric power consumption CP_M rapidly fluctuates between the timing T1 and a timing T2 as indicated by a broken line. As a result of a rapid decrease of the regenerative electric power at this time, a deceleration speed loss in which the deceleration speed rapidly decreases occurs. The deceleration speed loss between the timing T1 and the timing T2 is prevented as described below.

Figure 10:
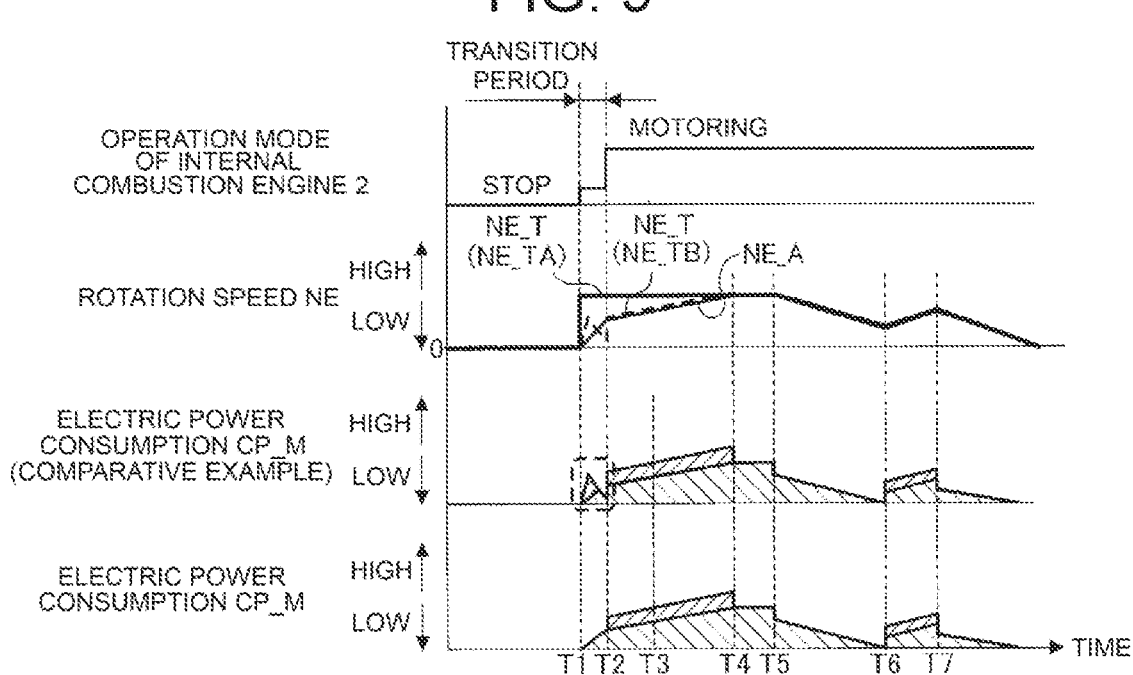
FIG. 10 is a diagram showing a second example of the timing chart.

FIG. 10 is a diagram showing a second example of the timing chart. The electric power consumption CP_M as a comparative example is as shown in FIG. 9. As compared with the case of FIG. 9, in the second example shown in FIG. 10, a condition that a magnitude of the difference $\Delta NE\_T$ is larger than the predetermined value $\Delta NE\_T1$ is further set as the invalid condition of the inertia electric power CP_I.

An operation mode of the internal combustion engine 2 is shifted to a motoring mode after a transition period between the timing T1 and the timing T2 at which the command rotation speed NE_TB rapidly fluctuates after the start of the motoring at the timing T1. The transition period is a transition period of the operation mode from a stop mode to the motoring mode, and in a case of the motoring mode, the actual rotation speed NE_A changes following the target rotation speed NE_T.

In the transition period, a magnitude of the difference $\Delta NE\_T$, that is, a gradient of the command rotation speed NE_TB constituting the target rotation speed NE_T is larger than the predetermined value $\Delta NE\_T1$.

Therefore, in the second example, the invalid condition of the inertia electric power CP_I is satisfied in the transition period, and the inertia electric power CP_I is not reflected in the electric power consumption CP_M. As a result, the electric power consumption CP_M does not rapidly decrease between the timing T1 and the timing T2, and the deceleration speed loss is prevented. A change after the timing T2 is the same as that in the first example.

Returning to FIG. 9, the actual rotation speed NE_A reaches the destination rotation speed NE_TA at a timing T4 and is constant. That is, the motoring is in a steady state. The command rotation speed NE_TB is the transient target rotation speed NE_T until the actual rotation speed NE_A reaches the destination rotation speed NE_TA, and thus becomes the destination rotation speed NE_TA at the timing T4. When the command rotation speed NE_TB is the destination rotation speed NE_TA, the target rotation speed NE_T is constituted by the destination rotation speed NE_TA.

As a result of the actual rotation speed NE_A becoming constant from the timing T4, the inertia electric power CP_I becomes zero. Therefore, the electric power consumption CP_M is the friction electric power consumption CP_A. The electric power consumption CP_M enclosed by a broken line at the timing T4 will be described later.

At a timing T5, the regenerative electric power starts to decrease. As a result, an electric power to be consumed by the motoring starts to decrease. Therefore, the target rotation speed NE_T starts to decrease, and the actual rotation speed NE_A also starts to decrease following the target rotation speed NE_T. The regenerative electric power decreases, for example, when depression of the accelerator pedal is released in the one-pedal mode.

At a timing T6, the regenerative electric power starts to increase. As a result, the electric power to be consumed by the motoring starts to increase. Therefore, the target rotation speed NE_T starts to increase from the timing T6, and the actual rotation speed NE_A also starts to increase following the target rotation speed NE_T.

At a timing T7, the regenerative electric power starts to decrease again, and accordingly, the target rotation speed NE_T and the actual rotation speed NE_A also start to decrease. The first example shows a case where a change in the target rotation speed NE_T (destination rotation speed NE_TA) after the timing T5 is the same as a change in the command rotation speed NE_TB in a fourth example shown in FIG. 12 to be described later.

In the first example shown in FIG. 9, a condition that the difference $\Delta NE\_T$ is smaller than zero described above, that is, a condition that the target rotation speed NE_T is decreasing is not set as the invalid condition of the inertia electric power CP_I.

Therefore, the electric power consumption CP_M is a value obtained by adding the inertia electric power CP_I with a negative component to the friction electric power consumption CP_A between the timing T5 and the timing T6. As a result, the electric power consumption CP_M rapidly decreases at the timing T5 as indicated by a broken line, and a deceleration speed loss occurs. Such a deceleration speed loss is prevented as described below.

Figure 11:
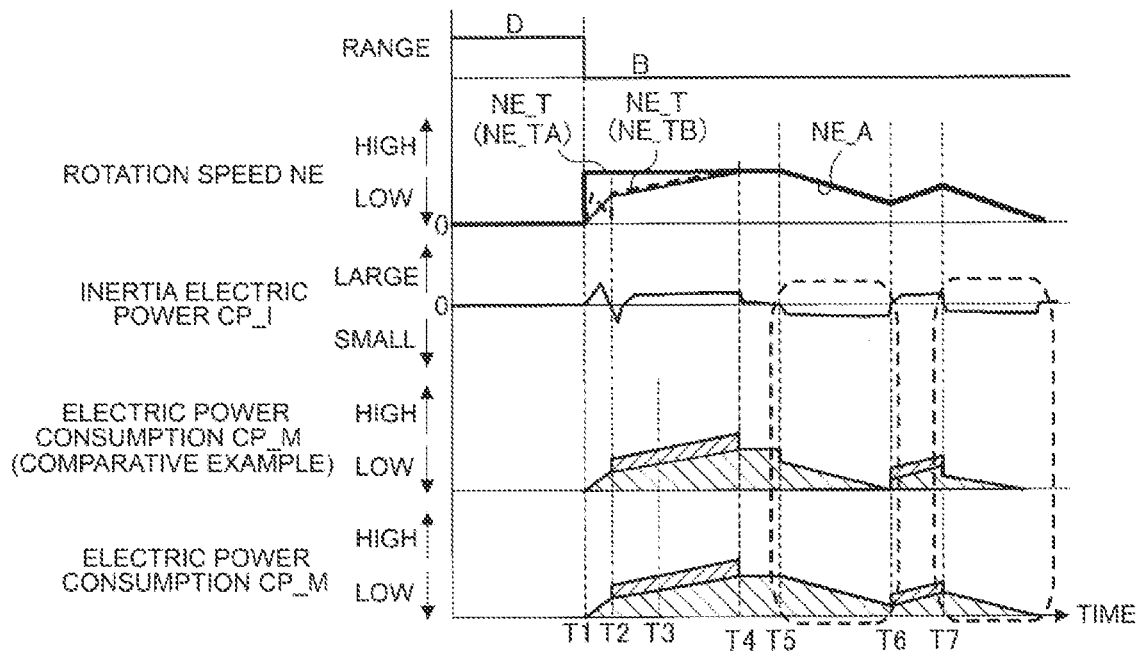
FIG. 11 is a diagram showing a third example of the timing chart.

FIG. 11 is a diagram showing a third example of the timing chart. The electric power consumption CP_M as a comparative example is as shown in FIG. 10. As compared with the case of FIG. 10, in the third example shown in FIG. 11, a condition that the difference $\Delta NE\_T$ is smaller than zero is further set as the invalid condition of the inertia electric power CP_I.

As a result of the regenerative electric power decreasing between the timing T5 and the timing T6, the target rotation speed NE_T decreases. Therefore, the difference $\Delta NE\_T$ is smaller than zero. At this time, the actual rotation speed NE_A also decreases following the target rotation speed NE_T, and thus the inertia electric power CP_I has a negative value as indicated by a broken line.

In the case of the comparative example, the condition that the difference $\Delta NE\_T$ is smaller than zero is not set as the invalid condition of the inertia electric power CP_I, and thus the electric power consumption CP_M rapidly decreases at the timing T5, and the deceleration speed loss occurs.

In the third example, when the difference $\Delta NE\_T$ is smaller than zero, the inertia electric power CP_I is made invalid. Therefore, the electric power consumption CP_M does not decrease due to the inertia electric power CP_I with the negative component between the timing T5 and the timing T6. As a result, a rapid decrease in the electric power consumption CP_M does not occur at the timing T5, and the deceleration speed loss is prevented.

At the timing T7, the inertia electric power CP_I is also made invalid, so that it is possible to prevent the rapid decrease in the electric power consumption CP_M, and prevent a deceleration speed loss. The timing T7 will be further described later.

As described above, as a result of the inertia electric power CP_I becoming zero from the timing T4, the electric power consumption CP_M is set to the friction electric power consumption CP_A. As a result, as indicated by the broken line in FIG. 9, the electric power consumption CP_M rapidly decreases at the timing T4, and a deceleration speed loss occurs. Such a deceleration speed loss is prevented as described below.

Figure 12:
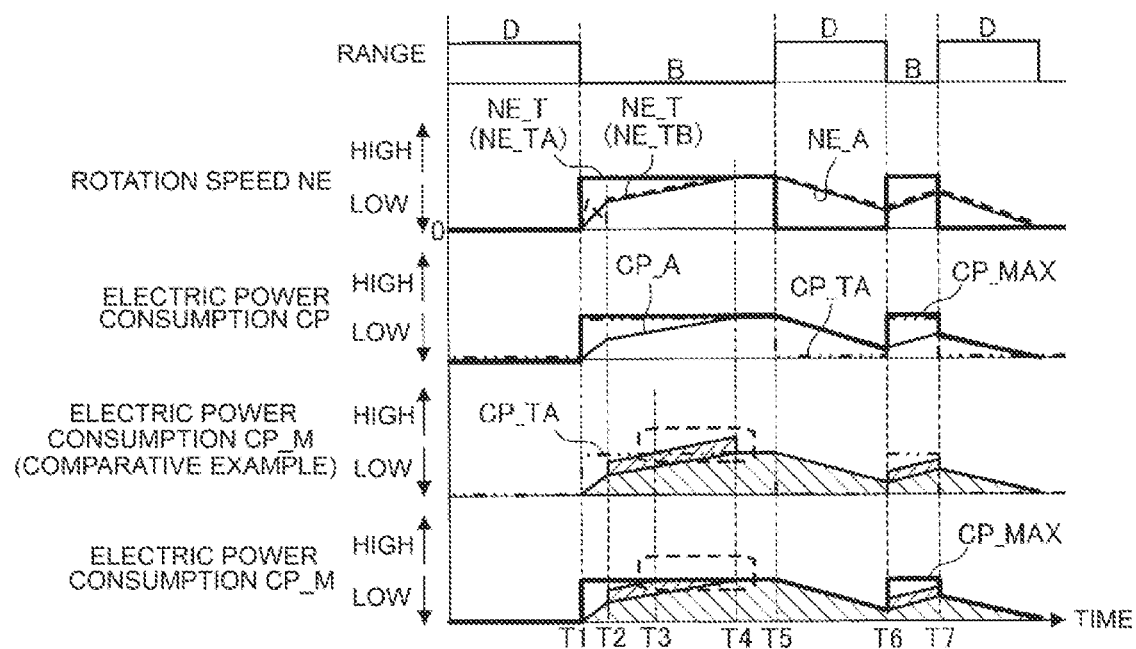
FIG. 12 is a diagram showing a fourth example of the timing chart.

FIG. 12 is a diagram showing the fourth example of the timing chart. The electric power consumption CP_M as a comparative example is as shown in FIG. 11. In the fourth example shown in FIG. 12, the invalid condition of the inertia electric power CP_I is the same as in the case of FIG. 11.

In the fourth example, a case where the range is set to the D range between the timing T5 and the timing T6 and after the timing T7 by the range switching will be described. In the D range, the deceleration speed is smaller than that in the B range, and the regenerative electric power does not exceed the acceptable electric power of the battery 5. Therefore, between the timing T5 and the timing T6 and after the timing T7, the target rotation speed NE_T of the motoring constituted by the destination rotation speed NE_TA is set to zero in order to stop the motoring, and is set to be lower than that in the B range. As a result, the destination electric power consumption CP_TA becomes zero. After the timing T5, the command rotation speed NE_TB changes so as to reach the destination electric power consumption CP_TA by a predetermined degree, and the actual rotation speed NE_A also changes following the command rotation speed NE_TB.

In the comparative example, the electric power consumption CP_M is equal to or larger than the destination electric power consumption CP_TA between the timing T3 and the timing T4 as indicated by a broken line. As a result, a deceleration speed loss occurs at the timing T4.

In the fourth example, a larger electric power consumption CP of the friction electric power consumption CP_A and the destination electric power consumption CP_TA is set as the upper limit CP_MAX of the electric power consumption CP_M. Therefore, in a case of the B range, the destination electric power consumption CP_TA is set to the upper limit CP_MAX, and in a case of the D range, the friction electric power consumption CP_A is set to the upper limit CP_MAX.

As a result, in the fourth example, the electric power consumption CP_M is set to the upper limit CP_MAX between the timing T3 and the timing T4 as indicated by a broken line. Therefore, the electric power consumption CP_M does not rapidly decrease at the timing T4, and the occurrence of the deceleration speed loss is prevented.

In the fourth example, since the upper limit CP_MAX in the case of the D range is described, a case where the D range is selected after the timing T1 has been described. The occurrence of the deceleration speed loss prevented in the fourth example is prevented also when the depression of the accelerator pedal is released in the B range after the timing T1, as in the case of FIG. 9.

The fourth example also reflects the prevention of the deceleration speed loss described in the second example and the third example. Even in such a fourth example, the electric power consumption CP_M still rapidly decreases at the timing T7, and as a result, a deceleration speed loss occurs. Such a deceleration speed loss is prevented as described below.

Figure 13:
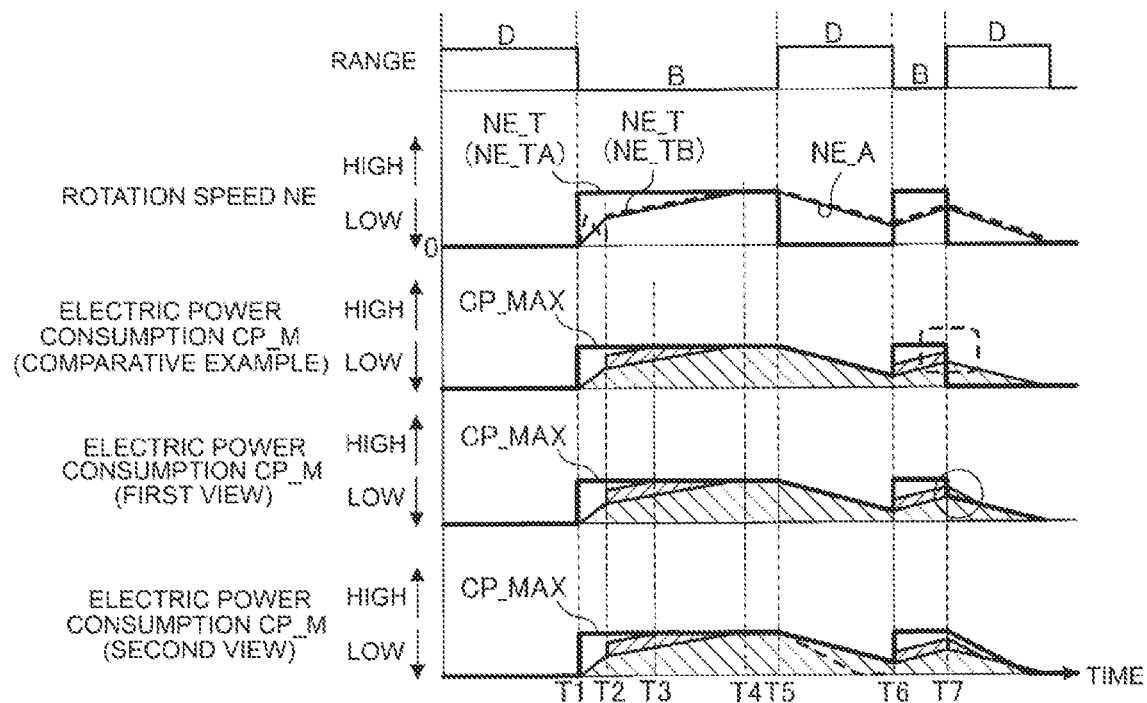
FIG. 13 is a diagram showing a fifth example of the timing chart.

FIG. 13 is a diagram showing a fifth example of the timing chart. The electric power consumption CP_M as a comparative example is as shown in FIG. 12. In the fifth example shown in FIG. 13, the invalid condition of the inertia electric power CP_I and a change in the range are the same as those in the case of FIG. 12.

At the timing T7, range switching from the B range to the D range having a deceleration speed smaller than that in the B range is performed, and in response to this, the destination rotation speed NE_TA decreases before the actual rotation speed NE_A reaches the destination rotation speed NE_TA. In this case, for example, the difference ΔNE_T is smaller than zero, and thus the invalid condition of the inertia electric power CP_I is satisfied, and in the case of the comparative example, the electric power consumption CP_M rapidly decreases at the timing T7 as indicated by a broken line.

In the fifth example, as described above with reference to FIGS. 5, 7, and 8, when the destination rotation speed NE_TA decreases before the actual rotation speed NE_A reaches the destination rotation speed NE_TA, the inertia electric power CP_I and the destination rotation speed NE_TA are changed while being rate-limited.

First, a case where the inertia electric power CP_I is rate-limited will be described with reference to a first view shown in FIG. 13. In this case, the inertia electric power CP_I gradually decreases from the timing T7 due to the rate limit as indicated by a circle.

The first view shows the destination rotation speed NE_TA (upper limit CP_MAX constituted by the destination electric power consumption CP_TA) before the rate limit between the timing T6 and the timing T7. A reason for performing the rate limit on the destination rotation speed NE_TA is as follows.

That is, after the timing T7 when the range becomes the D range, the friction electric power consumption CP_A is the upper limit CP_MAX as shown in the first view. Therefore, unless the destination rotation speed NE_TA is rate-limited, the rate-limited inertia electric power CP_I is not reflected in the electric power consumption CP_M due to the upper limit CP_MAX.

A second view shows the upper limit CP_MAX corresponding to the rate-limited destination rotation speed NE_TA (upper limit CP_MAX constituted by the rate-limited destination electric power consumption CP_TA). The rate-limited destination electric power consumption CP_TA gradually decreases from the timing T7. A degree of change in the destination electric power consumption CP_TA (electric power consumption limit change rate a) can be set equal to or less than a degree of change in the electric power consumption CP_M in which the rate-limited inertia electric power CP_I is reflected.

Accordingly, the destination electric power consumption CP_TA is larger than the friction electric power consumption CP_A to constitute the upper limit CP_MAX, and is larger than the electric power consumption CP_M after the rate limit. As a result, the rate-limited inertia electric power CP_I is reflected in the electric power consumption CP_M, and thus the electric power consumption CP_M does not rapidly decrease at the timing T7, and occurrence of a deceleration speed loss is prevented.

Also between the timing T5 and the timing T6, the destination electric power consumption CP_TA is rate-limited as indicated by a broken line. However, since the friction electric power consumption CP_A is larger than the rate-limited destination electric power consumption CP_TA between the timing T5 and the timing T6, the upper limit CP_MAX does not change.

Next, main functions and effects of the present embodiment will be described.

The vehicle 1 has the D range and the B range, and drives the drive wheels 6 by the traveling motor 4 using the electric power of the electric power generation motor 3 that is driven by the power of the internal combustion engine 2 to generate the electric power. When the regenerative electric power exceeding the acceptable electric power P_IN is generated by the traveling motor 4, the vehicle 1 performs the motoring of the internal combustion engine 2 by the electric power generation motor 3. The vehicle 1 performs the regeneration by the traveling motor 4 with the total electric power of the electric power consumption CP_M and the acceptable electric power P_IN as the upper limit. A method for controlling the vehicle 1 according to the present embodiment is used in such a vehicle 1, and the electric power consumption CP_M includes the friction electric power consumption CP_A and the inertia electric power CP_I.

According to such a method, when the range is the B range, the inertia electric power CP_I is included in the electric power consumption CP_M, so that it is possible to increase the deceleration speed in the B range. Therefore, it is possible to quickly obtain a feeling of deceleration due to the range switching during the regeneration accompanied by the motoring.

In the present embodiment, the target rotation speed NE_T includes the destination rotation speed NE_TA and the command rotation speed NE_TB, and when the magnitude of the difference $\Delta NE\_T$ is larger than the predetermined value $\Delta NE\_T1$, the inertia electric power CP_I is not included in the electric power consumption CP_M.

According to such a method, when the command rotation speed NE_TB rapidly fluctuates, the inertia electric power CP_I that fluctuates according to the command rotation speed NE_TB is not reflected in the electric power consumption CP_M. Therefore, it is possible to prevent the electric power consumption CP_M from rapidly changing due to the inertia electric power CP_I, and prevent a rapid change in a deceleration speed at a timing not intended by a driver.

In the present embodiment, when the difference $\Delta NE\_T$ is smaller than zero, that is, when the target rotation speed NE_T decreases, the inertia electric power CP_I is not included in the electric power consumption CP_M.

According to such a method, the inertia electric power CP_I with the negative component is not reflected in the electric power consumption CP_M. Therefore, it is possible to prevent the electric power consumption CP_M from rapidly decreasing due to the inertia electric power CP_I with the negative component, and prevent the deceleration speed loss from occurring.

In the present embodiment, when the target rotation speed NE_T constituted by the destination rotation speed NE_TA decreases before the actual rotation speed NE_A reaches the target rotation speed NE_T, by changing the inertia electric power CP_I while performing rate limit on the inertia electric power CP_I, and changing the destination electric power consumption CP_TA while performing rate limit on the destination electric power consumption CP_TA, the inertia electric power CP_I is gradually reflected in the electric power consumption CP_M.

According to such a method, the inertia electric power CP_I is changed while being rate-limited, and thus it is possible to avoid a situation in which the inertia electric power CP_I is not rapidly reflected in the electric power consumption CP_M when the target rotation speed NE_T decreases as described above. In addition, the destination electric power consumption CP_TA is changed while being rate-limited, and thus it is also possible to avoid a situation in which the rate-limited inertia electric power CP_I is not reflected in the electric power consumption CP_M due to the upper limit CP_MAX. As a result, when the target rotation speed NE_T decreases as described above, it is possible to prevent the electric power consumption CP_M from rapidly decreasing, and prevent the deceleration speed loss from occurring.

In the present embodiment, the destination electric power consumption CP_TA is a sum of the friction electric power consumption CP_A and the inertia electric power CP_I, that is, the upper limit CP_MAX of the electric power consumption CP_M.

According to such a method, it is possible to prevent the electric power consumption CP_M from rapidly decreasing due to the inertia electric power CP_I exceeding the destination electric power consumption CP_TA, and prevent the deceleration speed loss from occurring.

In the present embodiment, the inertia electric power CP_I is the electric power for generating or canceling the change in the inertia torque of the power transmission system 23.

According to such a method, the moment of inertia of the power transmission system 23 including the internal combustion engine 2 and the electric power generation motor 3 is taken into consideration, so that the inertia electric power CP_I can be appropriately calculated.

Although the embodiment of the present invention has been described above, the above embodiment is merely a part of application examples of the present invention, and is not intended to limit the technical scope of the present invention to the specific configurations of the above embodiment.

In the above embodiment, a case where the electric power consumption CP_M is obtained by adding the inertia electric power CP_I to the friction electric power consumption CP_A has been described. However, for example, the electric power consumption CP corresponding to a loss generated in the electric power generation motor 3 may be further added to the electric power consumption CP_M.

In the above embodiment, a case where the inertia electric power CP_I is not included in the electric power consumption CP_M when the magnitude of the difference $\Delta NE\_T$ is larger than the predetermined value $\Delta NE\_T1$ has been described.

However, when the magnitude of the difference $\Delta NE\_T$ is larger than the predetermined value $\Delta NE\_T1$, the inertia electric power CP_I may be gradually reflected in the electric power consumption CP_M by changing the inertia electric power CP_I while performing rate limit on the inertia electric power CP_I.

In this case, by gradually increasing the inertia electric power CP_I at a predetermined degree by the rate limit in the transition period of the operation mode of the internal combustion engine 2, it is possible to prevent a rapid decrease in the electric power consumption CP_M due to a rapid fluctuation in the inertia electric power CP_I, and prevent a deceleration speed loss. The predetermined degree can be set in advance such that when the mode is shifted to the motoring mode, the inertia electric power CP_I which is not rate-limited does not exceed the inertia electric power CP_I generated in the motoring mode. Accordingly, it is also possible to prevent the occurrence of the deceleration speed loss when the mode is shifted to the motoring mode.

In the above embodiment, a case where the target rotation speed NE_T includes the destination rotation speed NE_TA and the command rotation speed NE_TB has been described. However, the target rotation speed NE_T may be set to the destination rotation speed NE_TA. A case where a change in the target rotation speed NE_T is larger than a predetermined value includes such a case. The predetermined value can be set in advance as a value for defining a case where the target rotation speed NE_T rapidly fluctuates.

In the above embodiment, a case where the method for controlling a series hybrid vehicle and the calculation units are implemented by the single integrated controller 34 has been described. However, the method for controlling a series hybrid vehicle and the calculation units may be implemented by, for example, a combination of a plurality of controllers.

The invention claimed is:

1. A method for controlling a series hybrid vehicle having a first forward range and a second forward range, the method comprising:
    driving drive wheels by a traveling motor using an electric power generated by an electric power generation motor that is driven with a power of an internal combustion engine;
    performing motoring of the internal combustion engine by the electric power generation motor when a regenerative electric power exceeding an acceptable electric power of a battery is generated by the traveling motor; and
    performing regenerative deceleration with a total electric power of an electric power consumed by the motoring and the acceptable electric power of the battery as an upper limit, wherein
    the electric power consumed by the motoring includes an electric power consumption of the motoring determined according to friction of the internal combustion engine and an inertia electric power that is an electric power consumed for an inertia torque for changing a rotation speed of the internal combustion engine, and
    when a change in a target rotation speed of the motoring is larger than a predetermined value, the inertia electric power is not included in the electric power consumed by the motoring.

2. The method for controlling a series hybrid vehicle according to claim 1, wherein
    the target rotation speed includes a destination rotation speed corresponding to a target electric power of the electric power generation motor used for the motoring, and a command rotation speed that is a transient target rotation speed until a rotation speed of the motoring reaches the destination rotation speed, and
    when a magnitude of a command rotation acceleration speed, which is a change in the command rotation speed, is larger than a predetermined value, the inertia electric power is not included in the electric power consumed by the motoring.

3. The method for controlling a series hybrid vehicle according to claim 1, wherein
    when the target rotation speed decreases, the inertia electric power is not included in the electric power consumed by the motoring.

4. The method for controlling a series hybrid vehicle according to claim 1, wherein
    the target rotation speed includes a destination rotation speed corresponding to a target electric power of the electric power generation motor used for the motoring, and a command rotation speed that is a transient target rotation speed until a rotation speed of the motoring reaches the destination rotation speed, and
    when a magnitude of a command rotation acceleration speed, which is a change in the command rotation speed, is larger than a predetermined value, by changing the inertia electric power while performing rate limit on the inertia electric power, the inertia electric power is gradually reflected in the electric power consumed by the motoring.

5. The method for controlling a series hybrid vehicle according to claim 1, wherein
    when the target rotation speed decreases before a rotation speed of the motoring reaches the target rotation speed, by changing the inertia electric power while performing rate limit on the inertia electric power, and changing a destination electric power consumption estimated based on the target rotation speed while performing rate limit on the destination electric power consumption, the inertia electric power is gradually reflected in the electric power consumed by the motoring.

6. The method for controlling a series hybrid vehicle according to claim 1, wherein
    a destination electric power consumption estimated based on the target rotation speed is set as an upper limit of a sum of the electric power consumption of the motoring determined according to the friction of the internal combustion engine and the inertia electric power.

7. The method for controlling a series hybrid vehicle according to claim 1, wherein
    the inertia electric power is an electric power for generating or canceling a change in an inertia torque of a power transmission system that includes the internal combustion engine and the electric power generation motor and transmits a power from the electric power generation motor to the internal combustion engine during the motoring.

8. The method for controlling a series hybrid vehicle according to claim 1, further comprising:
    measuring the change in the target rotation speed;
    comparing the change in the target rotation speed to the predetermined value; and
    excluding the inertia electric power from the electric power consumed during motoring of the internal combustion engine when the change in the target rotation speed is larger than the predetermined value.

9. A series hybrid vehicle having a first forward range and a second forward range, wherein
    drive wheels are driven by a traveling motor using an electric power of an electric power generation motor that is driven with a power of an internal combustion engine to generate an electric power,
    motoring of the internal combustion engine is performed by the electric power generation motor when a regenerative electric power exceeding an acceptable electric power of a battery is generated by the traveling motor,
    regeneration is performed by the traveling motor with a total electric power of an electric power consumed by the motoring and the acceptable electric power of the battery as an upper limit, and the series hybrid vehicle comprises a calculation unit in which the electric power consumed by the motoring includes an electric power consumption of the motoring determined according to friction of the internal combustion engine, and an inertia electric power that is an electric power consumed for an inertia torque for changing a rotation speed of the internal combustion engine, and when a change in a target rotation speed of the motoring is larger than a predetermined value, the inertia electric power is not included in the electric power consumed by the motoring.

10. The series hybrid vehicle according to claim 9, wherein the calculation unit is configured to:

measure the change in the target rotation speed; and compare the change in the target rotation speed to the predetermined value, wherein the inertia electric power is excluded from the electric power consumed during motoring of the internal combustion engine when the change in the target rotation speed is larger than the predetermined value.

\* \* \* \* \*